(12) United States Patent
Lee et al.

(10) Patent No.: US 11,667,196 B2
(45) Date of Patent: Jun. 6, 2023

(54) VEHICLE AND METHOD OF CONTROLLING THE SAME

(71) Applicants: Hyundai Motor Company, Seoul (KR); Kia Motors Corporation, Seoul (KR); The Board of Trustees of the Leland Stanford Junior University, Palo Alto, CA (US)

(72) Inventors: Seunghwan Lee, Gyeonggi-do (KR); Sean Follmer, Stanford, CA (US); Inrak Choi, Incheon (KR)

(73) Assignees: Hyundai Motor Company, Seoul (KR); Kia Motors Corporation, Seoul (KR); The Board of Trustees of the Leland Stanford Junior University, Palo Alto, CA (US)

( * ) Notice: Subject to any disclaimer, the term of this patent is extended or adjusted under 35 U.S.C. 154(b) by 278 days.

(21) Appl. No.: 16/991,559

(22) Filed: Aug. 12, 2020

(65) Prior Publication Data
US 2022/0048387 A1  Feb. 17, 2022

(51) Int. Cl.
*B60K 35/00* (2006.01)
*G06F 3/01* (2006.01)

(52) U.S. Cl.
CPC .............. *B60K 35/00* (2013.01); *G06F 3/013* (2013.01); *B60K 2370/148* (2019.05); *B60K 2370/149* (2019.05); *B60K 2370/152* (2019.05)

(58) Field of Classification Search
CPC .............. B60K 35/00; B60K 2370/149; B60K 2370/152; B60K 2370/148; G06F 3/013; G06F 2203/0381
See application file for complete search history.

(56) References Cited

U.S. PATENT DOCUMENTS

| | | | |
|---|---|---|---|
| 2014/0345409 A1* | 11/2014 | Watanabe | F16H 59/08 74/473.3 |
| 2015/0210292 A1* | 7/2015 | George-Svahn | B60W 50/10 348/148 |
| 2017/0158233 A1* | 6/2017 | Herzog | B62D 15/024 |
| 2017/0235360 A1* | 8/2017 | George-Svahn | G02B 27/017 345/173 |
| 2017/0293355 A1* | 10/2017 | Mangin | B60R 11/04 |
| 2018/0357040 A1* | 12/2018 | Spiewla | G06F 3/0488 |
| 2019/0324531 A1* | 10/2019 | Eraslan | G06F 21/32 |
| 2022/0063411 A1* | 3/2022 | Heisterkamp | B60R 16/037 |

* cited by examiner

*Primary Examiner* — Christopher E Leiby
(74) *Attorney, Agent, or Firm* — Fox Rothschild LLP

(57) ABSTRACT

A vehicle is configured to enable precise control while minimizing distractions during driving and improving user convenience by receiving a user input that combines the user's gaze or speech with a physical operation. The vehicle includes a first input device configured to receive a first user input by at least one of the user's speech or user's gaze; a second input device configured to receive a second user input by the physical operation of the user; and a controller configured to determine a control item corresponding to the first user input among a plurality of control items when the first input device receives the first user input, and to determine a sub-control item for the determined control item based on the second user input when the second input device receives the second user input.

18 Claims, 14 Drawing Sheets

1

TOP VIEW

SIDE VIEW

VEHICLE AND METHOD OF CONTROLLING THE SAME

BACKGROUND

(a) Technical Field

The disclosure relates to a vehicle capable of performing various controls, and a method of controlling the vehicle.

(b) Description of the Related Art

In a vehicle, various controls related to vehicle functions, such as door control, window control, air conditioner control, and multimedia control, as well as driving-related controls can be performed, and control commands can be input from a user to perform these controls.

As described above, since various controls can be performed in the vehicle, the user needs to select a desired control item among various control items, and input a detailed physical operation or control command with respect to the selected control item. In addition, the result of the control is completed while receiving feedback through a display around a control panel or in the vehicle, or detailed adjustment is performed.

The control command, confirmation, and feedback may expand the display as the function or information in the vehicle increases rapidly, and a driver's attention may be dispersed by increasing the number of gaze movements and the number of operations as the number of manipulations increases.

SUMMARY

An aspect of the disclosure is to provide a vehicle that enables precise control while minimizing distractions during driving while improving user convenience by receiving a user input by combining the user's gaze or speech with a physical operation, and a method of controlling the vehicle.

In accordance with an aspect of the disclosure, a vehicle includes a first input device configured to receive a first user input by at least one of a user's speech or a user's gaze; a second input device configured to receive a second user input by a physical operation of the user; and a controller configured to determine a control item corresponding to the first user input among a plurality of control items when the first input device receives the first user input, and to determine a sub-control item for the determined control item based on the second user input when the second input device receives the second user input.

The first input device may include an eye tracker configured to recognize the user's gaze.

The controller may be configured to determine the control item based on a control target located in a direction in which the user's gaze is facing.

The vehicle may further include a display configured to display a plurality of graphic objects respectively corresponding to the plurality of control items. The controller may be configured to activate the control item corresponding to the graphic object located in a direction located in which the user's gaze is facing among the plurality of graphic objects.

When the control item is activated, the controller may be configured to use the second user input to determine the sub-control item for the activated control item.

The first input device may include a speech recognizer configured to recognize the user's speech.

The controller may be configured to determine the control item corresponding to a command included in the user's speech.

When the control item is determined, the controller may be configured to provide information about the determined control item to the user by at least one of hearing or vision.

The second input device may be configured to provide to be movable up, down, left, and right by the physical operation of the user.

A movement direction of the second input device may be configured to be limited according to the determined control item.

In accordance with another aspect of the disclosure, a method of controlling a vehicle, the vehicle including a first input device configured to receive a first user input by at least one of a user's speech or a user's gaze, and a second input device configured to receive a second user input by a physical operation of the user, the method includes when the first input device receives the first user input, determining a control item corresponding to the first user input among a plurality of control items; and when the second input device receives the second user input, determining a sub-control item for the determined control item based on the second user input.

The first input device may include an eye tracker configured to recognize the user's gaze.

The determining of the control item corresponding to the first user input may include determining the control item based on a control target located in a direction in which the user's gaze is facing.

The method may further include displaying a plurality of graphic objects respectively corresponding to the plurality of control items; and activating the control item corresponding to the graphic object located in a direction located in which the user's gaze is facing among the plurality of graphic objects.

The determining of the sub-control item for the determined control item may include determining the sub-control item corresponding to the second user input among a plurality of sub-control items for the activated control item.

The first input device may include a speech recognizer configured to recognize the user's speech.

The determining of the control item corresponding to the first user input may include determining the control item corresponding to a command included in the user's speech.

The method may further include when the control item is determined, providing information about the determined control item to the user by at least one of hearing or vision.

The second input device may be configured to provide to be movable up, down, left, and right by the physical operation of the user.

A movement direction of the second input device may be configured to be limited according to the determined control item.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
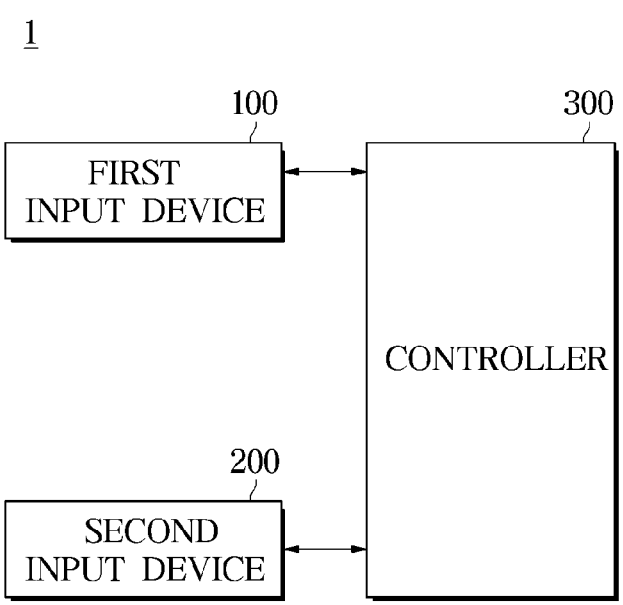
FIG. 1 is a control block diagram of a vehicle according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The following description is merely exemplary in nature and is not intended to limit the present disclosure, application, or uses. It should be understood that throughout the drawings, corresponding reference numerals indicate like or corresponding parts and features. Configurations and drawings described herein are examples of the disclosure, and there may be various modifications that can replace the exemplary forms and drawings of the present disclosure at the time of filing of the present application.

Hereinafter, a vehicle and a method of controlling the vehicle according to an aspect will be described in detail with reference to the accompanying drawings.

FIG. 1 is a control block diagram of a vehicle according to an embodiment.

Referring to FIG. 1, a vehicle 1 may include a first input device 100 for receiving a first user input by at least one of a user's speech or a user's gaze, and a second input device 200 for receiving a second user input by a physical operation of the user, and a controller 300 for determining a control item corresponding to the first user input among the plurality of control items when the first input device 100 receives the first user input and determining a sub-control item for the control item determined based on the second user input when the second input device 200 receives the second user input.

The control items that can be performed in the vehicle 1 may include two or more control items among air conditioning control, door control, window control, multimedia control, seat control, sunroof control, lighting control, navigation control, autonomous driving control, and other vehicle-related setting control. However, the listed control items are only examples applicable to the embodiment of the vehicle 1, and other control items may be included in addition to the examples.

The first input device 100 may receive the first user input by the user's speech or may receive the first user input by the user's gaze. That is, the user may easily input a selection of the desired control item without physical operation or contact by simply speaking a desired control item by speech or gazing at an area corresponding to the desired control item.

After the user inputs the selection for the desired control item through the first input device 100, the user may physically operate the second input device 200 to precisely input specific control items for the selected control item.

In order to enable the physical operation of the user, the second input device 200 may be provided to be movable according to a direction of a force applied from the outside, and the user may input a sub-control item that is a specific control content for the control item by applying the force to the second input device 200. A detailed description of a structure of the second input device 200 or the sub-control item input by the user through the second input device 200 will be provided later.

An operation of the controller 300 to determine the control item corresponding to the first user input varies depending on a type of the first user input, which will be described later in detail.

When the second user input is received by the second input device 200 after the first input device 100 receives the first user input, the controller 300 may determine the sub-control item based on the second user input.

When the sub-control item is determined, the controller 300 may control the vehicle 1 according to the determined sub-control item.

The controller 300 includes at least one memory for storing a program for performing the above-described operations and the operations described below, and various data for executing the program, and at least one processor for executing the stored program. When a plurality of memories and processors included in the controller 300 are provided, the memories and the processors may be integrated on one chip or may be physically separated.

Hereinafter, specific embodiments will be described for each case in which the first input device 100 receives the first user input through the user's gaze and the second user input through the user's speech.

Figure 2:
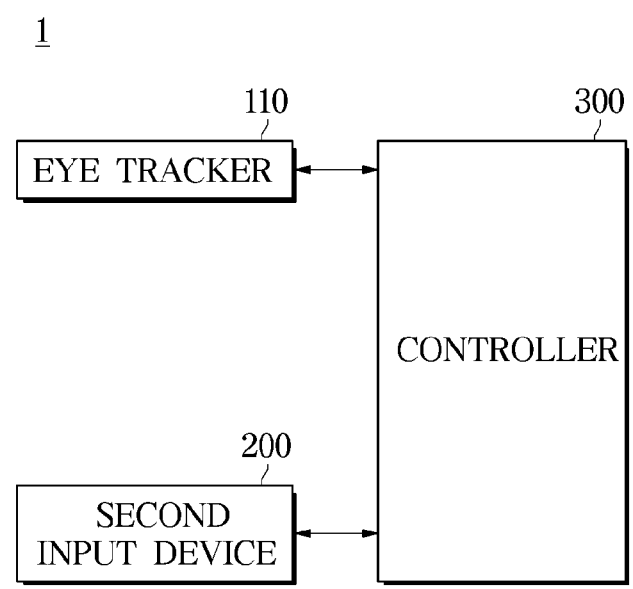
FIG. 2 is a control block diagram when a first input device of a vehicle includes an eye tracker according to an embodiment.
Figure 3:
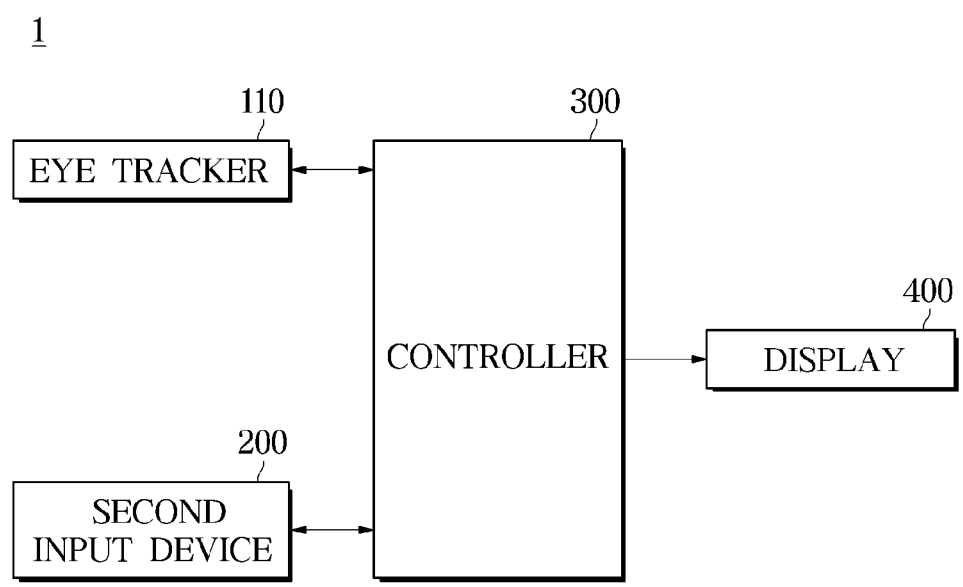
FIG. 3 is a control block diagram when a vehicle further includes a display according to an embodiment.

FIG. 2 is a control block diagram when a first input device of a vehicle includes an eye tracker according to an embodiment, and FIG. 3 is a control block diagram when a vehicle further includes a display according to an embodiment.

The first input device 100 of the vehicle 1 may receive the first user input through the user's gaze. In this case, as illustrated in FIG. 2, the first input device 100 may include an eye tracker 110 that tracks the user's gaze.

The eye tracker 110 may include a camera that obtains a user's eye image and a microprocessor that recognizes an eye by applying an image processing algorithm to the obtained eye image and determines a direction in which the recognized eye is facing, that is, the gaze.

It is also possible that the eye tracker 110 further includes an LED. The LED may irradiate light to form light reflection points on a cornea. When the camera captures the user's eye image, the microprocessor may identify the light reflection points and pupils on the cornea from the captured eye image by applying the image processing algorithm. In addition, the direction of the eye, that is, the gaze, may be calculated based on the light reflection points and other geometric features.

However, the above-described gaze recognition method is only an example applicable to the embodiment of the vehicle 1, and of course, other gaze recognition methods may be applied to the embodiment of the vehicle 1 in addition to the above-described method.

When the eye tracker 110 determines the user's gaze, the controller 300 may determine the control item corresponding to the user's gaze among the plurality of control items.

Referring to FIG. 3, the vehicle 1 may further include a display 400 provided therein. The controller 300 may control the display 400 to display a plurality of graphic objects 410 (see FIG. 5) corresponding to the plurality of control items, respectively, and may determine, among the plurality of graphic objects 410, the control item corresponding to a graphic object located in a direction in which the user's gaze is facing, as the control item corresponding to the user's gaze.

Also, the controller 300 may activate the control item corresponding to the user's gaze. The operation of the controller 300 to activate the control item will be described later.

Figure 4:
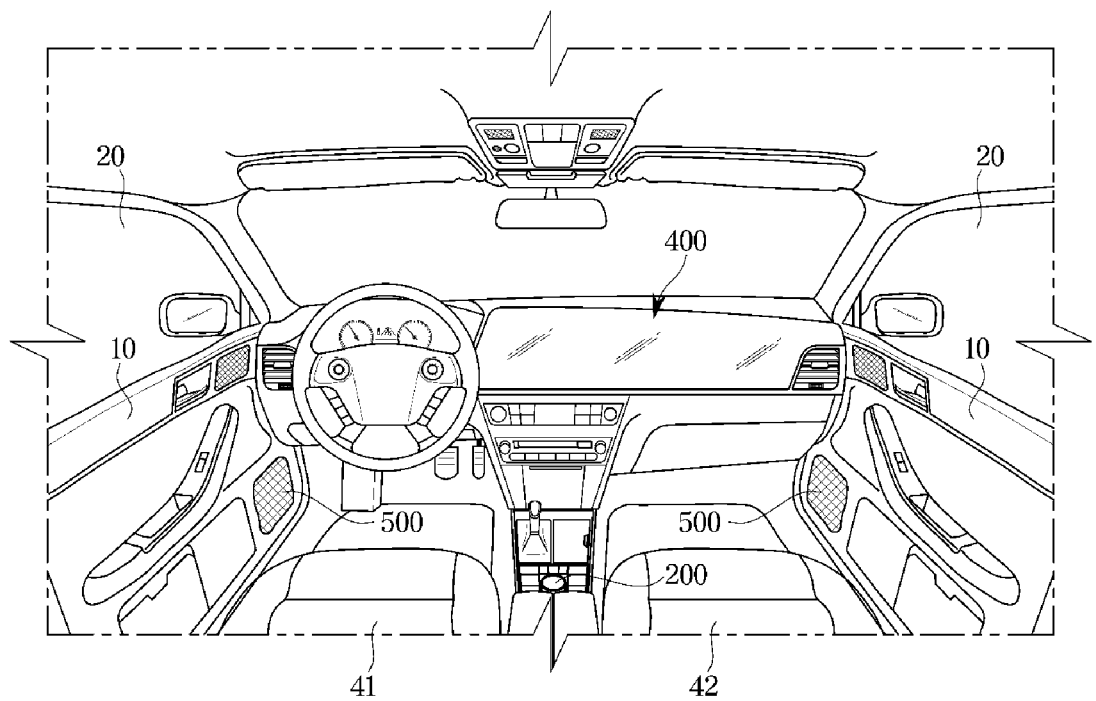
FIG. 4 is a view illustrating a part of an internal configuration of a vehicle according to an embodiment.
Figure 5:
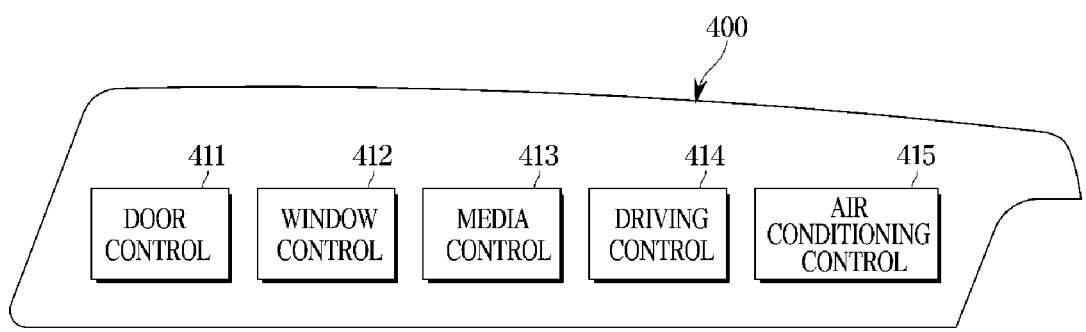
FIG. 5 is a view illustrating an example of a graphic object displayed on a display of a vehicle according to an embodiment.

FIG. 4 is a view illustrating a part of an internal configuration of a vehicle according to an embodiment, and FIG. 5 is a view illustrating an example of a graphic object displayed on a display of a vehicle according to an embodiment.

Referring to FIG. 4, for example, the display 400 may be provided in a dashboard area inside the vehicle 1, and may employ one of various types of displays such as a light emitting diode (LED) display, an organic light emitting diode (OLED) display, and a liquid crystal display (LCD). Alternatively, it may be in the form of an icon or an LED indicator that is illuminated on an operation object itself rather than a separate display depending on the operation object.

The display 400 may display not only the plurality of graphic objects 410 corresponding to the plurality of control items, but also an image or text required to perform each control item. For example, a multimedia content may be displayed, a navigation screen may be displayed, and information related to a vehicle state may be displayed.

In addition, as described below, the display 400 may display a graphic object corresponding to the sub-control item for the selected control item to guide the second user input, or may provide feedback for the first user input or the second user input.

Referring to the example of FIG. 5 together, the controller 300 may display a graphic object 411 corresponding to door control, a graphic object 412 corresponding to window control, a graphic object 413 corresponding to media control, a graphic object 414 corresponding to driving control, and a graphic object 415 corresponding to air conditioning control among the plurality of control items.

When the user gazes at one of the plurality of graphic objects 410 displayed on the display 400, the eye tracker 110 may capture the user's eye image to calculate the user's gaze and transmit the result to the controller 300.

The controller 300 may detect the graphic object located in the direction in which the user's gaze is facing among the plurality of graphic objects 410 displayed on the display 400 and determine it as the graphic object corresponding to the user's gaze.

For example, when the user gazes at the graphic object 411 corresponding to the door control, the eye tracker 110 may recognize the user's gaze, and the controller 300 may determine the control item corresponding to the user's gaze as the door control to activate the door control. When the door control is activated, the user may control the lock/unlock function of a door 10 by physically operating the second input device 200 provided in the vehicle 1. The second input device 200 may be provided between a driver's seat 41 and a passenger seat 42, but this is only an example, and may be provided in another position as long as the user's hand touches it.

Alternatively, when the user gazes at the graphic object 412 corresponding to the window control, the eye tracker 110 may recognize the user's gaze, and the controller 300 may determine the control item corresponding to the user's gaze as the window control to activate the window control. When the window control is activated, the user may control the up/down function of a window 20 by physically operating the second input device 200.

Alternatively, when the user gazes at the graphic object 413 corresponding to media control, the eye tracker 110 may recognize the user's gaze, and the controller 300 may determine the control item corresponding to the user's gaze as the media control to activate the media control. When the media control is activated, the user may physically operate the second input device 200 to select a multimedia content output through the display 400 or a speaker 500.

Alternatively, when the user gazes at the graphic object 414 corresponding to the driving control, the eye tracker 110 may recognize the user's gaze, and the controller 300 may determine the control item corresponding to the user's gaze as the driving control to activate the driving control. When the driving control is activated, the user may physically operate the second input device 200 to control a driving speed or a driving direction.

Alternatively, when the user gazes at the graphic object 415 corresponding to the air conditioning control, the eye tracker 110 may recognize the user's gaze, and the controller 300 may determine the control item corresponding to the user's gaze as the air conditioning control to activate the air conditioning control. When the air conditioning control is activated, the user may physically operate the second input device 200 to perform temperature control, air volume control, or wind direction control using an air conditioner.

The graphic object illustrated in FIG. 5 is only an example applicable to the embodiment of the vehicle 1, and it is also possible that different types, different shapes, or different numbers of graphic objects than the example of FIG. 5 are displayed on the display 400.

Figure 6:
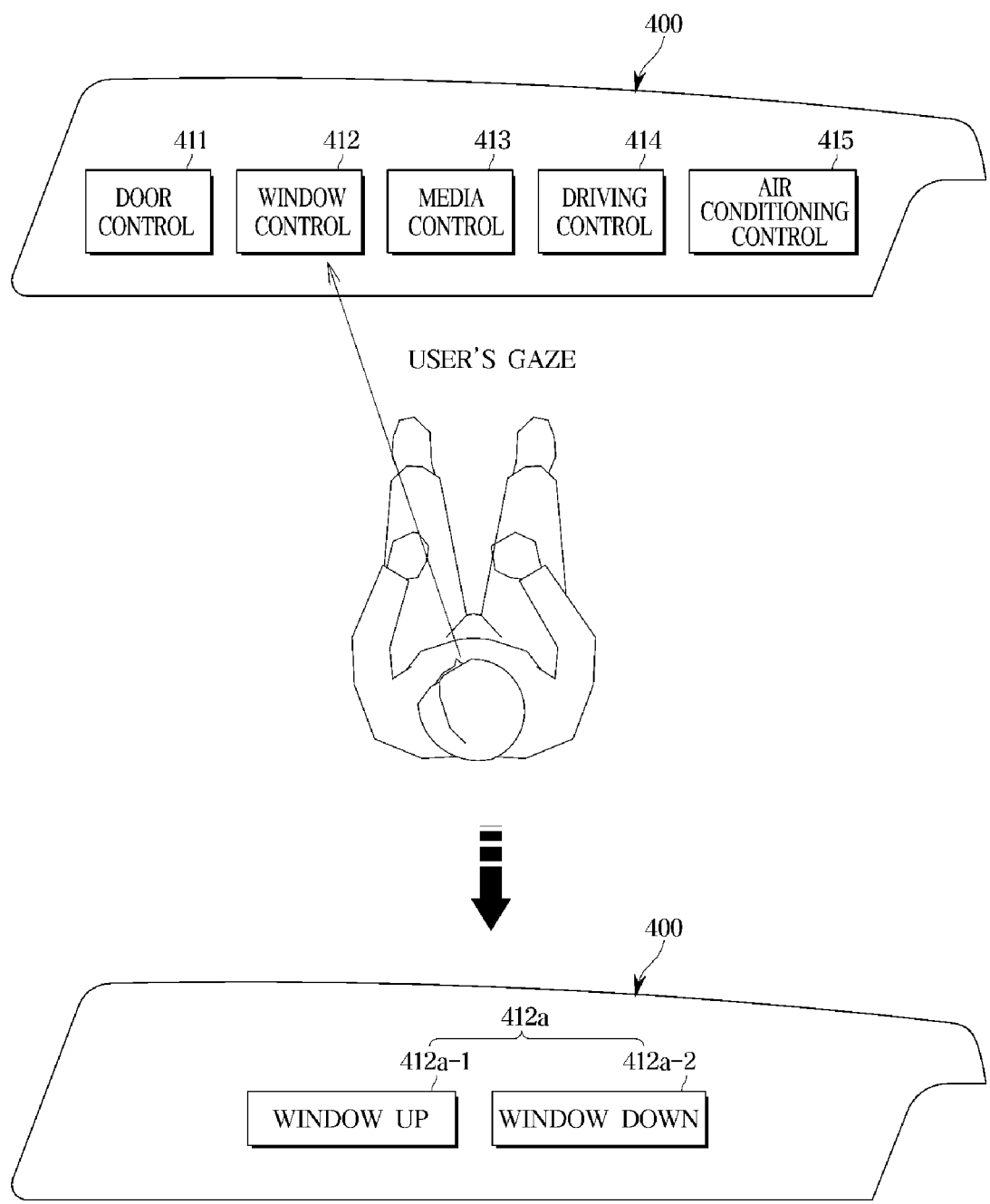
FIGS. 6 and 7 are views illustrating examples of graphic objects that may be displayed on a display when a control item is activated in a vehicle according to an embodiment.
Figure 7:
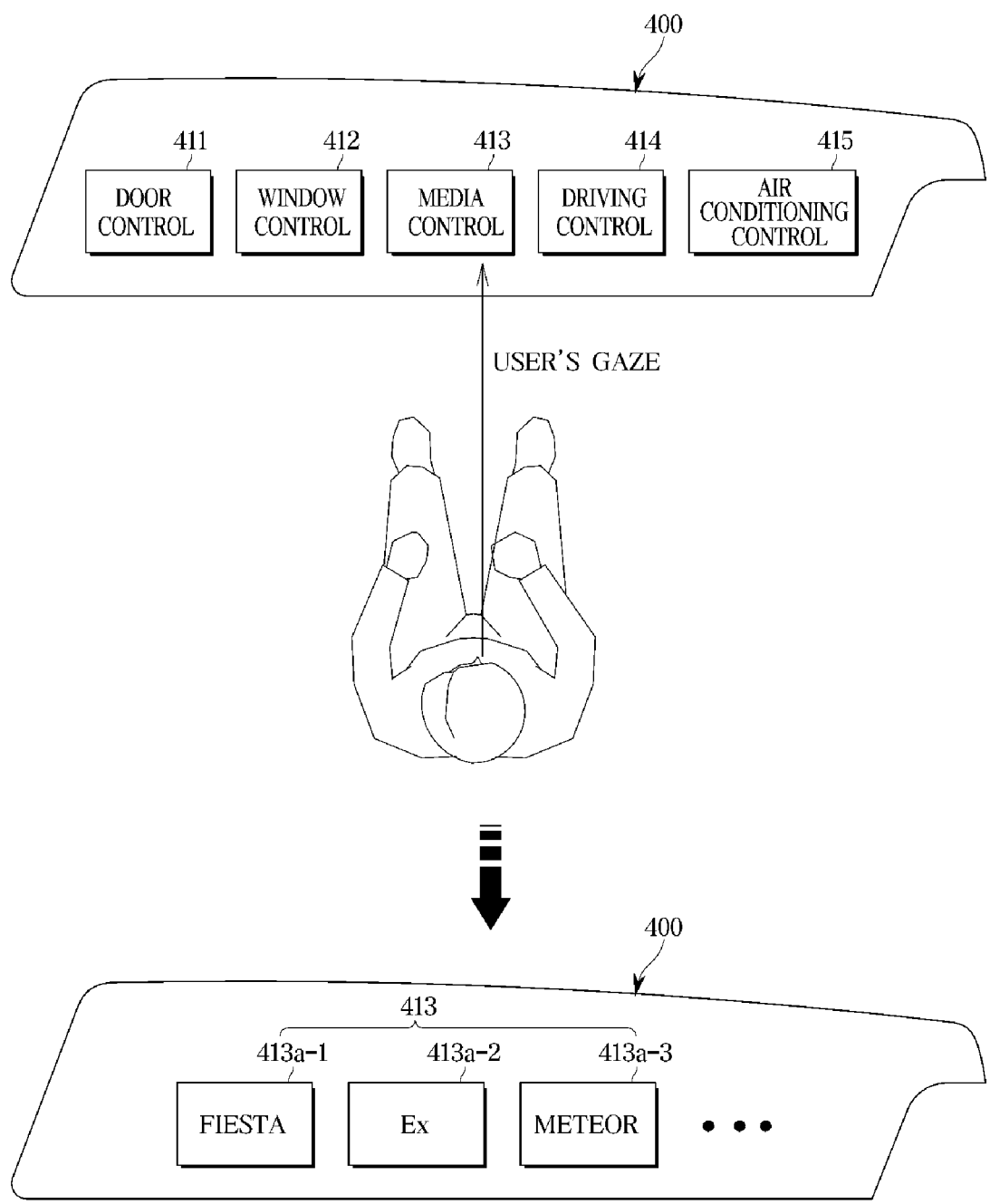

FIGS. 6 and 7 are views illustrating examples of graphic objects that may be displayed on a display when a control item is activated in a vehicle according to an embodiment.

As described above, the controller 300 may activate the control item corresponding to the graphic object located in the direction in which the user's gaze is facing, among the plurality of graphic objects 410 displayed on the display 400. In the embodiment, activating the control item may refer to switching to a state that can receive a specific control command from the user in order to perform control corresponding to the control item. That is, when the control item is activated, the control command input by the user by operating the second input device 200 may be used to determine the sub-control item for the activated control item.

The sub-control item may correspond to the specific control content for the control item, and each of the plurality of control items may have at least one sub-control item.

For example, when the control item is the door control, the sub-control item for this may include the door lock and the door unlock functions, and when the control item is the window control, the sub-control item for this may include the window up and the window down functions. When the control item is the media control, each of the plurality of multimedia contents may be included in the sub-control item.

In addition, when the control item is the driving control, the sub-control item for this may include speed up and speed down, or may include change of the driving direction (left and right). When the control item is the air conditioning control, the sub-control item may include temperature up and the temperature down, air volume up and air volume down, or change of the wind direction.

In addition, when the control item is the sunroof control, the sub-control item for this may include sunroof open and sunroof close. When the control item is the lighting control, the sub-control item for this may include lighting on and lighting off, or may include lighting brightness adjustment. When the control item is the seat control, the sub-control item for this may include adjusting the position or angle of the seat.

In addition to the above-described examples, the sub-control items for various control items may be applied to the embodiment of the vehicle 1.

The user may physically operate the second input device 200 to input the selection for the sub-control item. At this time, the display 400 may guide the user's selection by displaying the graphic object corresponding to the sub-control item. Particularly, when the control item corresponding to the first user input is determined, the controller 300 may control the display 400 to display the graphic object corresponding to the sub-control item for the determined control item.

For example, when the user gazes at the graphic object 412 corresponding to the window control among the plurality of graphic objects 410 displayed on the display 400, as illustrated in FIG. 6, graphic objects 412a-1 and 412a-2 corresponding to the plurality of sub-control items (window up and window down) for the window control may be displayed on the display 400.

The user may select the window up or window down function by operating the second input device 200 while viewing the graphic objects 412a-1 and 412a-2 corresponding to the sub-control item displayed on the display 400.

Alternatively, when the user gazes at the graphic object 413 corresponding to the media control among the plurality of graphic objects 410 displayed on the display 400, as illustrated in FIG. 7, graphic objects 413a-1, 413a-2, and 413a-3 corresponding to the plurality of sub-control items (multimedia content selection) for the media control may be displayed on the display 400.

The user may select desired content from the plurality of multimedia contents by operating the second input device 200 while viewing the graphic objects 413a-1, 413a-2, and 413a-3 corresponding to the sub-control item displayed on the display 400.

Figure 8:
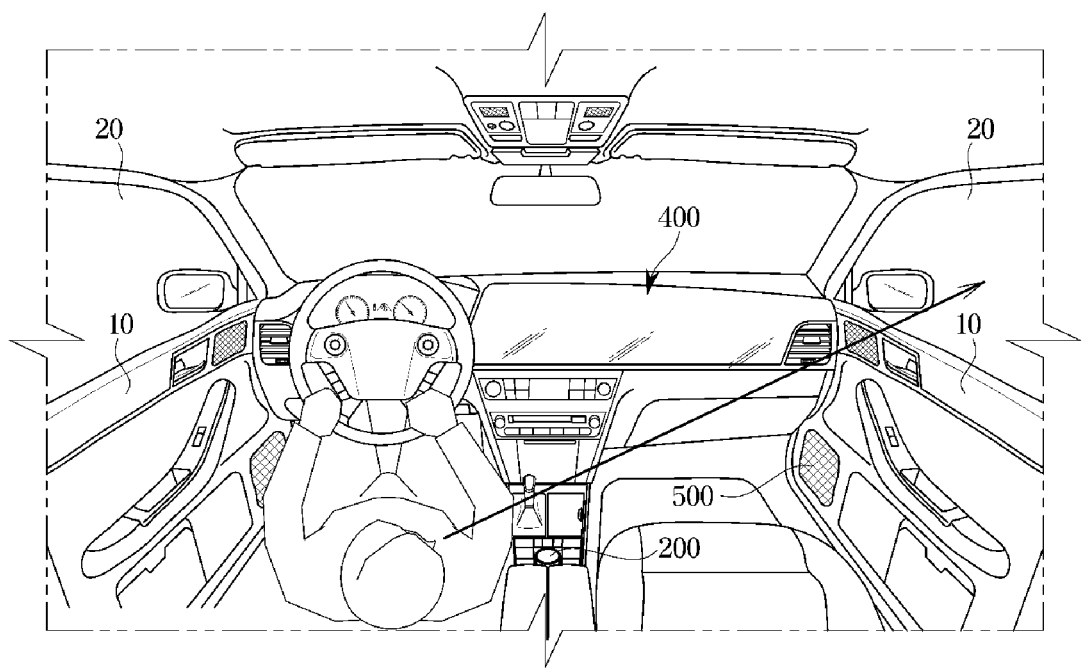
FIG. 8 is a view illustrating another example of determining a control item by recognizing a user's gaze in a vehicle according to an embodiment.

FIG. 8 is a view illustrating another example of determining a control item by recognizing a user's gaze in a vehicle according to an embodiment.

In the above-described example, the display 400 may display the plurality of graphic objects 410 corresponding to each of the plurality of control items, and the user may input a selection for the control item in a manner that the user gazes at one of the plurality of graphic objects.

According to another example, it is also possible for the user to input the selection for the control item in a manner that the user gazes at a control target of the control item. The controller 300 may determine the control item based on the control target located in the direction in which the user's gaze is facing.

For example, as illustrated in FIG. 8, the user may gaze the window 20 to control the window 20. The eye tracker 110 may capture the user's eye image to calculate the user's gaze, and the controller 300 may determine that the control target located in the direction in which the user's gaze is facing is the window 20, and may determine the control item the corresponding to the first user input as the window control.

To this end, the controller 300 may pre-store information about the control target for each control item and position information of each of the control targets, and may determine the control items corresponding to the user's gaze based on the pre-stored position information and the information about the control target.

Figure 9:
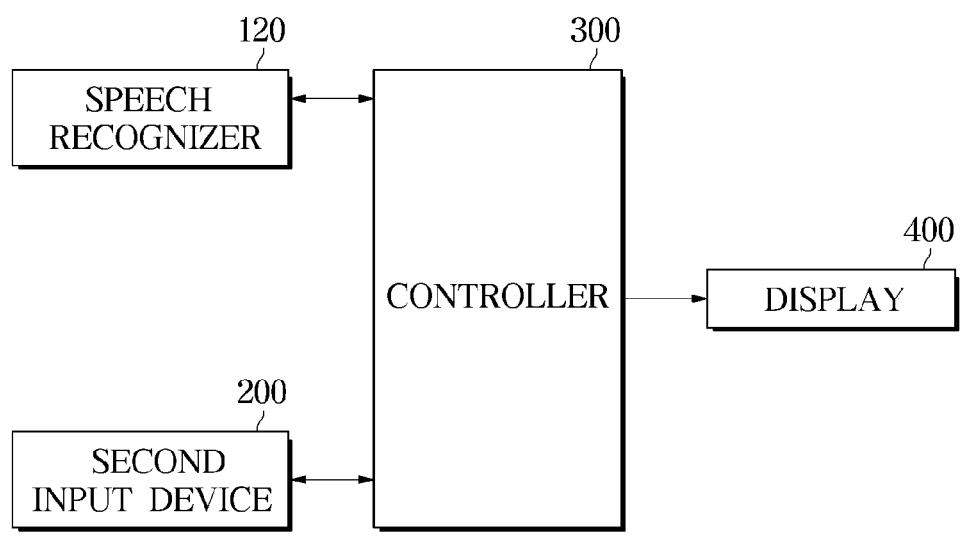
FIG. 9 is a control block diagram when a first input device of a vehicle includes a speech recognizer according to an embodiment.

FIG. 9 is a control block diagram when a first input device of a vehicle includes a speech recognizer according to an embodiment.

In the example described above, the first input device 100 may include the eye tracker 110 and determine the control item based on the user's gaze. According to another example, it is also possible for the vehicle 1 to determine the control item based on the user's speech.

To this end, as illustrated in FIG. 9, the first input device 100 may include a speech recognizer 120, and may further include a microphone. The speech recognizer 120 may include a speech recognition engine, and the speech recognition engine may recognize a speech uttered by the user by applying a speech recognition algorithm to the speech input to the microphone, and may output the recognition result as text.

On the other hand, the first input device 100 does not include a microphone, it is also possible to receive the user's speech from the user's mobile device equipped with the microphone, such as a mobile phone.

When the user's speech is converted to the text and transmitted to the controller 300 by the first input device 100, the controller 300 may determine the control item corresponding to a command included in the user's speech. For example, the command included in the user's speech may directly match at least one of the plurality of control items, or may include words associated with at least one of the plurality of control items.

For example, when the user utters the phrase "door control", the command included in user's speech may directly match the control item, and when the user utters "I want to adjust a temperature", it is a case that the command included in the user's speech contains the word (temperature) associated with the control item.

In addition, when the user utters the phrase "window control", the command included in the user's speech may directly match the control item, and when the user utters "wind", it is a case that the command included in the user's speech contains the word (wind/cloud) associated with the control item.

Figure 10:
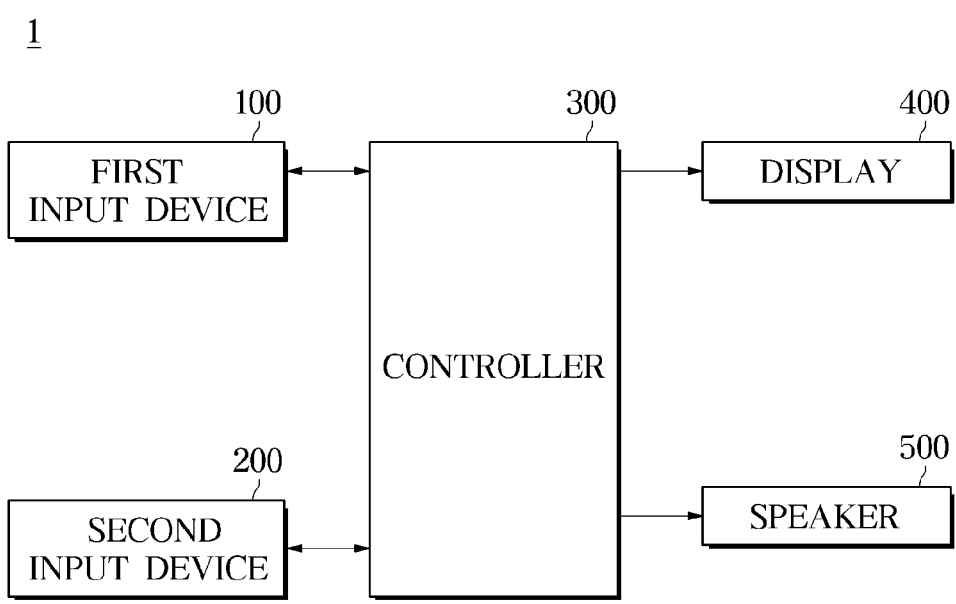
FIG. 10 is a control block diagram of a vehicle further including a speaker.

FIG. 10 is a control block diagram of a vehicle further including a speaker.

Referring to FIG. 10, the vehicle 1 may further include the speaker 500, and as illustrated in FIG. 4 described above, the speaker 500 may be provided inside the door 10. However, a position of the speaker 500 is not so limited, and it may be provided in a position other than the inside of the door 10 if such a position is capable of providing audible information to the user inside the vehicle 1.

When the first input device 100 receives the first user input and the controller 300 determines the control item corresponding to the first user input, the controller 300 may provide the information about the determined control item to the user. In particular, when the first input device 100 includes the eye tracker 110 and the user selects the control item by gazing the graphic object corresponding to the desired control item or the control object of the desired control item, the user may need to check whether the selection of the control item is properly selected.

Accordingly, the controller 300 may control at least one of the display 400 and the speaker 500 to visually or audibly output information about the selected control item.

In a case of using the display 400, the information about the control item corresponding to the first user input may be output as the text or the image or the lighting or icon on the operation object itself, or when using the speaker 500, the information about the control item corresponding to the first user input may be output as a sound.

For example, when the display 400 is used, when the control item corresponding to the first user input is the air conditioning control, the vehicle 1 may make changes such as emphasizing the graphic object 415 displayed on the display 400, displaying the graphic object corresponding to the sub-control item of the air conditioning control, or displaying text indicating that the air conditioning control is selected.

When the speaker 500 is used, the vehicle 1 may output sound having content that the air conditioning control is selected through the speaker 500. Through the information output from the display 400 or the speaker 500, the user may check whether the control item is selected according to the user's intention.

Figure 11:
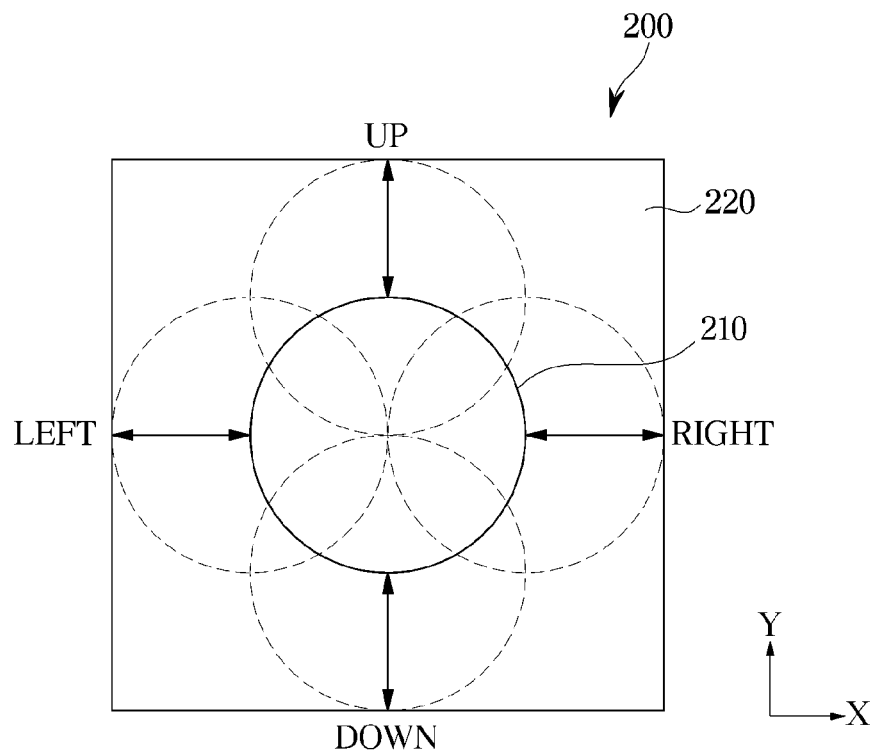
FIG. 11 is a view schematically illustrating an appearance of a second input device included in a vehicle according to an embodiment.
Figure 11:
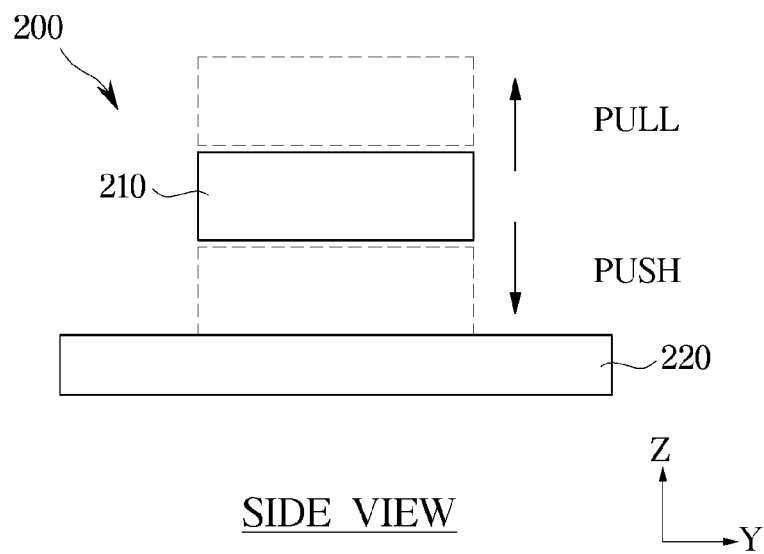
Figure 12:
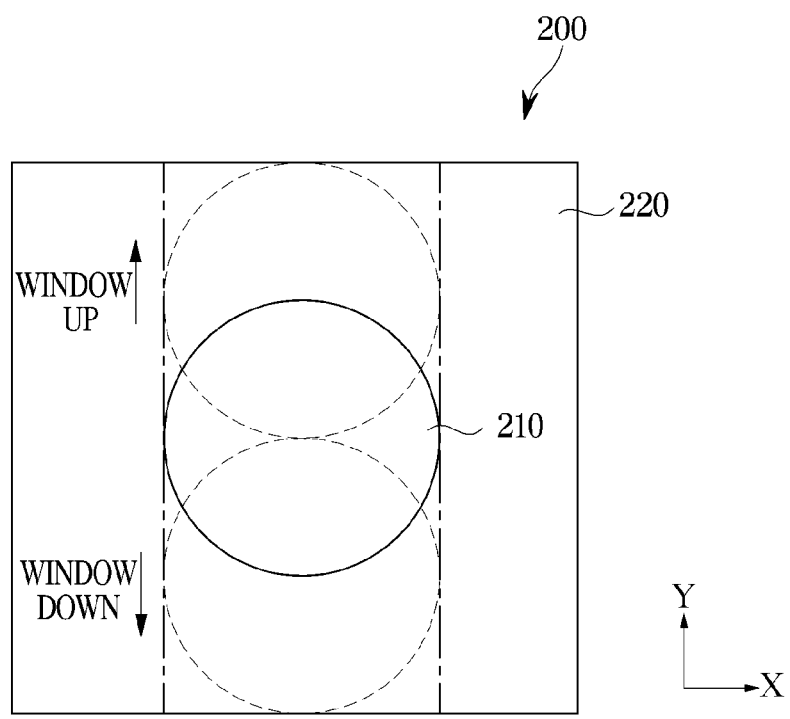
FIGS. 12 and 13 are views illustrating a moving direction of a second input device included in a vehicle according to an embodiment.
Figure 13:
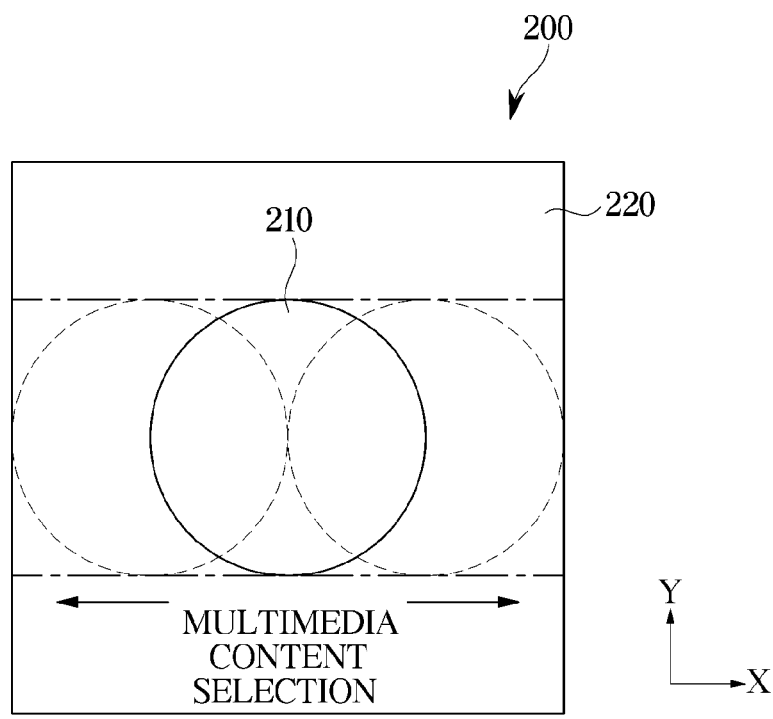

FIG. 11 is a view schematically illustrating an appearance of a second input device included in a vehicle according to an embodiment, and FIGS. 12 and 13 are views illustrating a moving direction of a second input device included in a vehicle according to an embodiment.

Referring to FIG. 11, the second input device 200 may include a body 210 that is movable up, down, left, and right, and a housing 220 in which various components supporting the body 210 and enabling a movement of the body 210 are embedded.

Referring to a top view of FIG. 11, the body 210 may move up, down, left, and right on the housing 200. A vertical direction may refer to a y-axis direction, and a horizontal direction may refer to an x-axis direction. The body 210 may be moved by a force applied from the outside, and the user may move the body 210 in a desired direction by applying the force to the body 210.

Referring to a side view of FIG. 11, the body 210 may move in a direction away from the housing 220, that is, a+z direction, or may move in a direction closer to the housing 220, that is, a−z direction. The user may move the body 210 in the z-axis direction by pulling or pushing the body 210.

As described above, the user may physically operate the second input device 200 to input the selection for the sub-control item. Particularly, the user may move the body 210 in the direction corresponding to the desired sub-control item by applying the force to the second input device 200.

The user may select the desired sub-control item by moving the body 210 in the up, down, left, and right directions, and the second user input may be the user applying the force to move the second input device 200.

In addition, the user may confirm the selected sub-control item by pushing the body 210, or cancel the selection by pulling the body 210 or return to a previous step.

The controller 300 may determine the sub-control item corresponding to the second user input based on the direction of the force applied to the second input device 200.

For example, when the control item corresponding to the first user input is the window control, as illustrated in FIG. 12, the user may input a window up command by moving the body 210 of the second input device 200 in an upward direction, and may input a window down command by moving the body 210 in a downward direction.

At this time, as illustrated in FIG. 6, the graphic object 412a displayed on the display 400 may be referred to.

Alternatively, when the control item corresponding to the first user input is the media control, as illustrated in FIG. 12, the user may select a desired multimedia content by moving the body 210 of the second input device 200 in the left and right directions. For example, as illustrated in FIG. 7 described above, when the graphic object 413a corresponding to each of a plurality of playable multimedia contents is displayed on the display 400, the user may select the desired multimedia content by moving the body 210 of the second input device 200 in the left and right directions.

Meanwhile, the movement direction of the second input device 200 may be limited according to the control item corresponding to the first user input. For example, when the sub-control items for the control item corresponding to the first user input have an up/down relationship, as illustrated in FIG. 12, the moving direction of the second input device 200 is limited to the vertical direction and may not move in the horizontal direction. As another example, when the sub-control items for the control item corresponding to the first user input have an equal relationship, as illustrated in FIG. 13, the moving direction of the second input device 200 is limited to the horizontal direction and may not move in the vertical direction.

By limiting the moving direction of the second input device 200 in this way, it is possible to guide the user's physical operation according to the control item corresponding to the first user input.

The second input device 200 may include at least one motor involved in the movement of the body 210, a driving circuit driving the at least one motor, and a microprocessor controlling the driving circuit. When a control signal related to the control item or a control signal related to a moving direction of the body 210 is input from the controller 300, the microprocessor of the second input device 200 may control the driving circuit to limit the moving direction of the body 210 according to the control item correspond to the first user input.

Hereinafter, a method of controlling the vehicle 1 according to an embodiment will be described. The above-described vehicle 1 may be applied to the embodiment of a vehicle control method. Therefore, the contents described with reference to FIGS. 1 to 13 may be applied to the embodiment of the vehicle control method.

Figure 14:
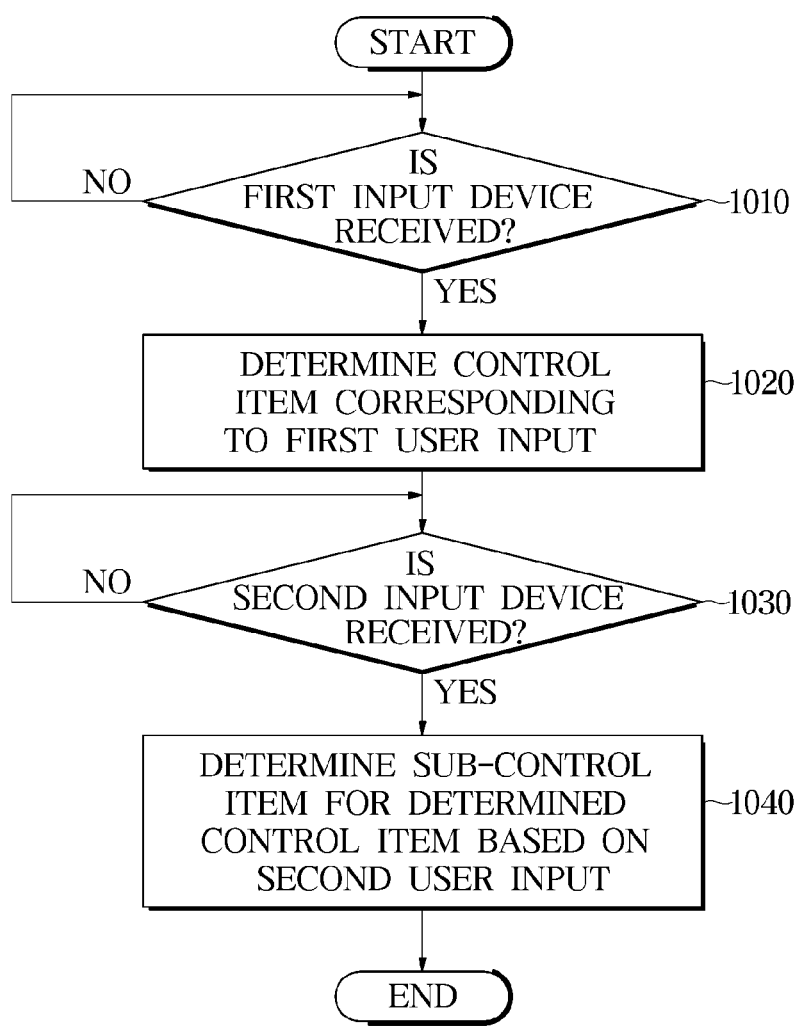
FIG. 14 is a flowchart illustrating a method of controlling a vehicle according to an embodiment.

FIG. 14 is a flowchart illustrating a method of controlling a vehicle according to an embodiment.

Referring to FIG. 14, when the first input device 100 receives the second user input (YES in 1010), the controller 300 may determine the control item corresponding to the first user input (1020).

As described above, the first input device 100 may receive the first user input through the user's gaze or user's speech. When the first input device 100 includes the eye tracker 110, the first user input may be received by the user's eyes. When the first input device 100 includes the speech recognizer 120, the first user input may be received by the user's speech.

When the first user input is received by the user's gaze, as illustrated in FIG. 5 described above, the plurality of graphic objects 410 corresponding to the plurality of control items may be displayed on the display 400 of the vehicle 1. When the user gazes at one of the plurality of graphic objects 410 displayed on the display 400, the eye tracker 110 may capture the user's eyes to calculate the user's gaze and transmit the result to the controller 300. The controller 300 may detect the graphic object located in the direction in which the user's gaze is facing among the plurality of graphic objects 410 displayed on the display 400 and determine the graphic object corresponding to the user's gaze.

The controller 300 may activate the control item corresponding to the graphic object located in the direction in which the user's gaze is facing, among the plurality of graphic objects 410 displayed on the display 400. When the control item is activated, the control command input by the user by operating the second input device 200 may be used to determine the sub-control item for the activated control item. To guide the second user input, the controller 300 may control the display 400 to display the graphic object corresponding to the sub-control item for the determined control item.

Alternatively, without displaying the graphic object 410 on the display 400, it is also possible to determine the control item based on the object located in a direction in which the user's gaze is facing. In this case, the user may provide the first user input by directly gazing at the control target of the control item. For example, when the control target is the window 20, the user may directly gaze at the window 20, and the controller 300 may determine that the object located in the direction of the user's gaze is the window 20 and determine the control item is the window control.

When the first user input is received by the user's speech, the speech recognizer 120 may convert the user's speech into text and transmit it to the controller 300, and the controller 300 may determine the control item corresponding to the command included in the user's speech, and may activate the determined control item.

In addition, when the control item is determined, the information about the determined control item may be audibly provided through the speaker 500 or visually provided through the display 400.

When the second user input is received through the second input device 200 (YES in 1030), the controller 300 may determine the sub-control item for the determined control item based on the second user input (1040).

There may be the plurality of sub-control items for each control item, and the controller 300 may determine the sub-control item corresponding to the second user input among the plurality of sub-control items.

As illustrated in FIGS. 11 to 13, the second input device 200 may be provided to be movable up, down, left, and right by the force applied from the outside. The user may select the desired sub-control item by moving the second input device 200 in the vertical direction or the horizontal direction, and the second user input may be the user applying the force to move the second input device 200.

Meanwhile, when the control item is determined by the user's first user input, the moving direction of the second input device 200 may be limited. For example, when the sub-control items for the determined control item have the up/down relationship, as illustrated in FIG. 12, the moving direction of the second input device 200 is limited to the vertical direction and may not move in the horizontal direction. As another example, when the sub-control items for the determined control item have an equal relationship, as illustrated in FIG. 13, the moving direction of the second input device 200 is limited to the horizontal direction and may not move in the vertical direction.

The controller 300 may determine the sub-control item corresponding to the second user input based on the direction of the force applied to the second input device 200. When the sub-control item is determined, the controller 300 may control the vehicle 1 according to the determined sub-control item.

According to embodiments of the disclosure, the vehicle and the method of controlling the vehicle may enable precise control while minimizing distractions during driving while improving user convenience by receiving the user input by combining the user's gaze or the user's speech with the user's physical operation.

Embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example, and should not be interpreted in a limited sense.

What is claimed is:
1. A vehicle, comprising:
   a first input device configured to receive a first user input by at least one of a user's speech or a user's gaze;
   a second input device configured to receive a second user input by a physical operation of the user; and
   a controller configured to:

when the first input device receives the first user input, determine a control item corresponding to the first user input among a plurality of control items, and when the second input device receives the second user input, determine a sub-control item for the determined control item based on the second user input, wherein a movement direction of the second input device is configured to be limited according to the determined control item.

2. The vehicle according to claim 1, wherein the first input device comprises an eye tracker configured to recognize the user's gaze.

3. The vehicle according to claim 2, wherein the controller is configured to determine the control item based on a control target located in a direction in which the user's gaze is facing.

4. The vehicle according to claim 2, further comprising:
a display configured to display a plurality of graphic objects respectively corresponding to the plurality of control items,
wherein the controller is configured to activate the control item corresponding to the graphic object located in a direction located in which the user's gaze is facing among the plurality of graphic objects.

5. The vehicle according to claim 4, wherein when the control item is activated, the controller is configured to use the second user input to determine the sub-control item for the activated control item.

6. The vehicle according to claim 1, wherein the first input device comprises a speech recognizer configured to recognize the user's speech.

7. The vehicle according to claim 6, wherein the controller is configured to determine the control item corresponding to a command included in the user's speech.

8. The vehicle according to claim 1, wherein when the control item is determined, the controller is configured to provide information about the determined control item to the user by at least one of hearing or vision.

9. The vehicle according to claim 1, wherein the second input device is configured to provide to be movable up, down, left, and right by the physical operation of the user.

10. A method of controlling a vehicle, the vehicle including a first input device configured to receive a first user input by at least one of a user's speech or a user's gaze, and a second input device configured to receive a second user input by a physical operation of the user, the method comprising:

when the first input device receives the first user input, determining, by a controller, a control item corresponding to the first user input among a plurality of control items; and when the second input device receives the second user input, determining, by the controller, a sub-control item for the determined control item based on the second user input, wherein a movement direction of the second input device is configured to be limited according to the determined control item.

11. The method according to claim 10, wherein the first input device comprises an eye tracker configured to recognize the user's gaze.

12. The method according to claim 11, wherein determining the control item corresponding to the first user input comprises:
determining the control item based on a control target located in a direction in which the user's gaze is facing.

13. The method according to claim 11, further comprising:
displaying a plurality of graphic objects respectively corresponding to the plurality of control items; and
activating the control item corresponding to the graphic object located in a direction located in which the user's gaze is facing among the plurality of graphic objects.

14. The method according to claim 13, wherein determining the sub-control item for the determined control item comprises:
determining the sub-control item corresponding to the second user input among a plurality of sub-control items for the activated control item.

15. The method according to claim 10, wherein the first input device comprises a speech recognizer configured to recognize the user's speech.

16. The method according to claim 15, wherein determining the control item corresponding to the first user input comprises:
determining the control item corresponding to a command included in the user's speech.

17. The method according to claim 10, further comprising:
when the control item is determined, providing information about the determined control item to the user by at least one of hearing or vision.

18. The method according to claim 10, wherein the second input device is configured to provide to be movable up, down, left, and right by the physical operation of the user.

* * * * *